J. C. FIDDYMENT.
MACHINE FOR FINISHING TIRE MOLDS.
APPLICATION FILED DEC. 23, 1918.
1,339,816.
Patented May 11, 1920.
4 SHEETS—SHEET 1.
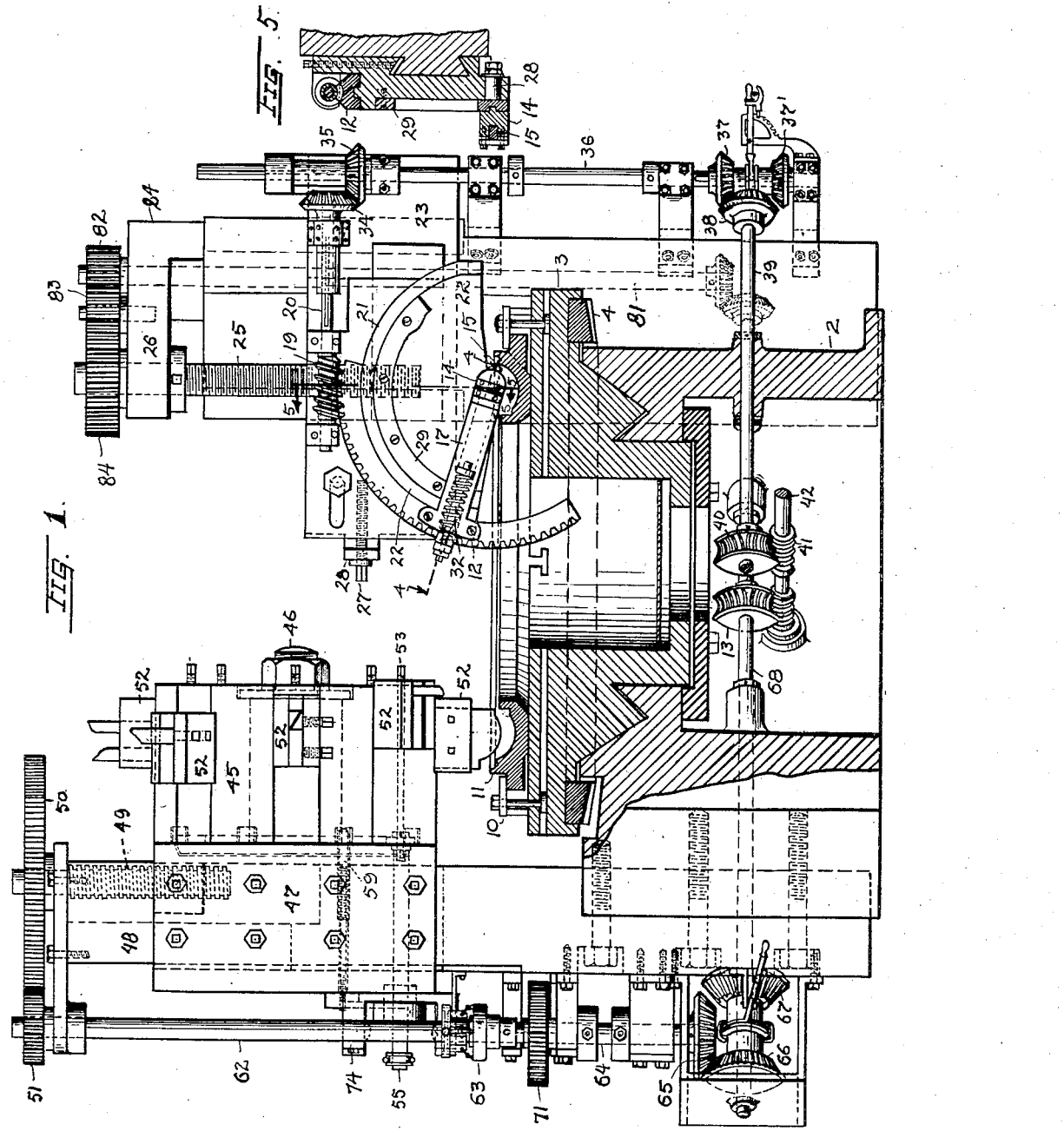
Witness
Geo. E. Kricker.
INVENTOR
J. C. FIDDYMENT.
By Fisher & Moser
Attorneys

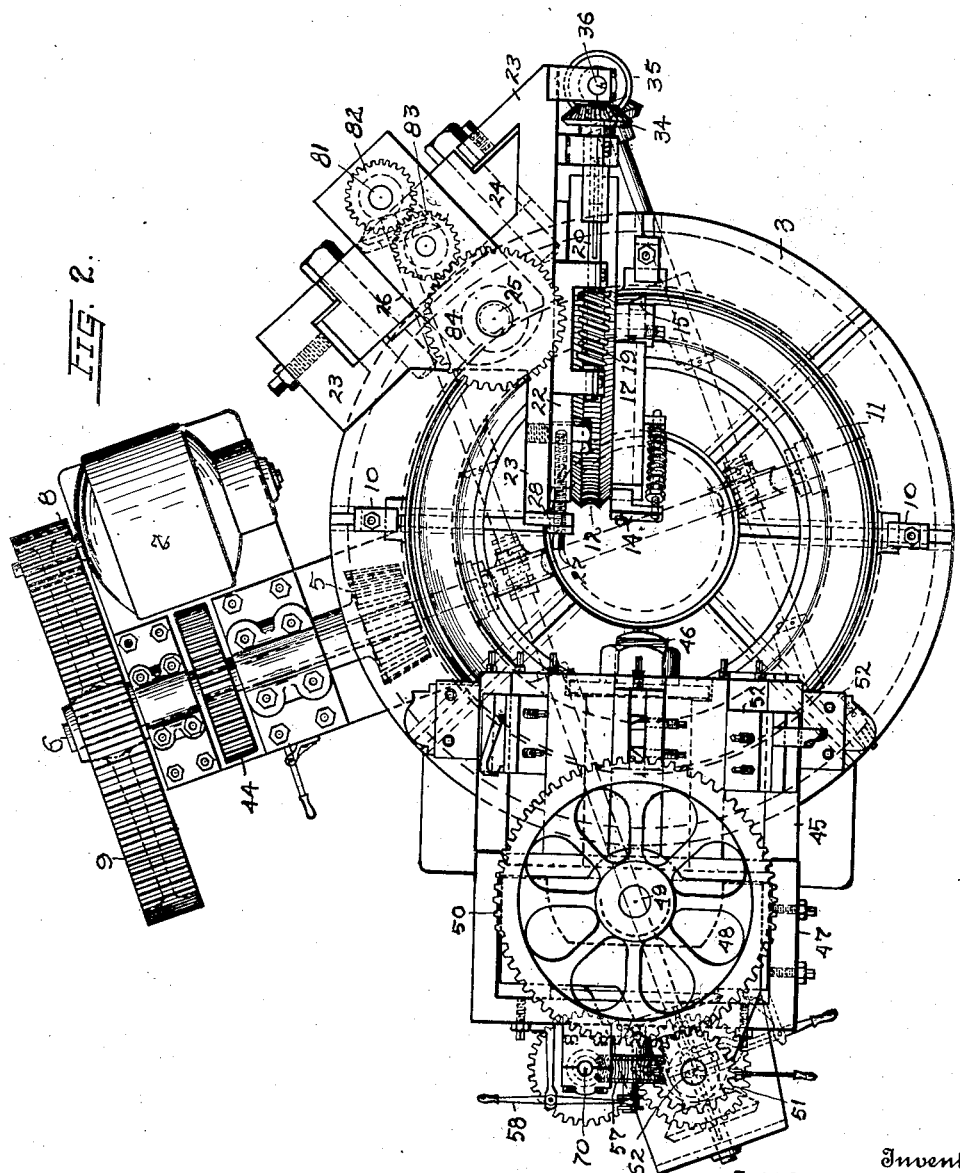

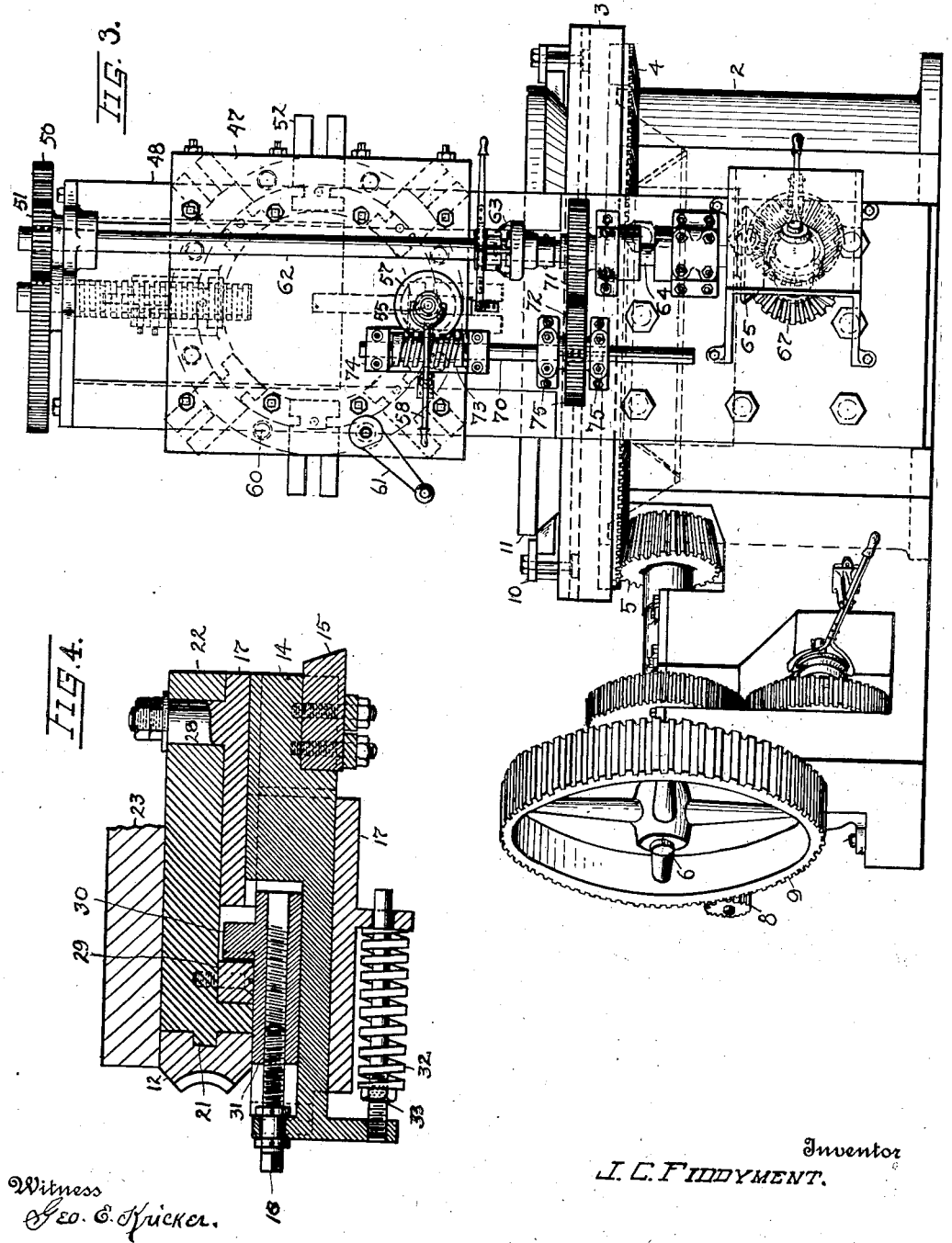

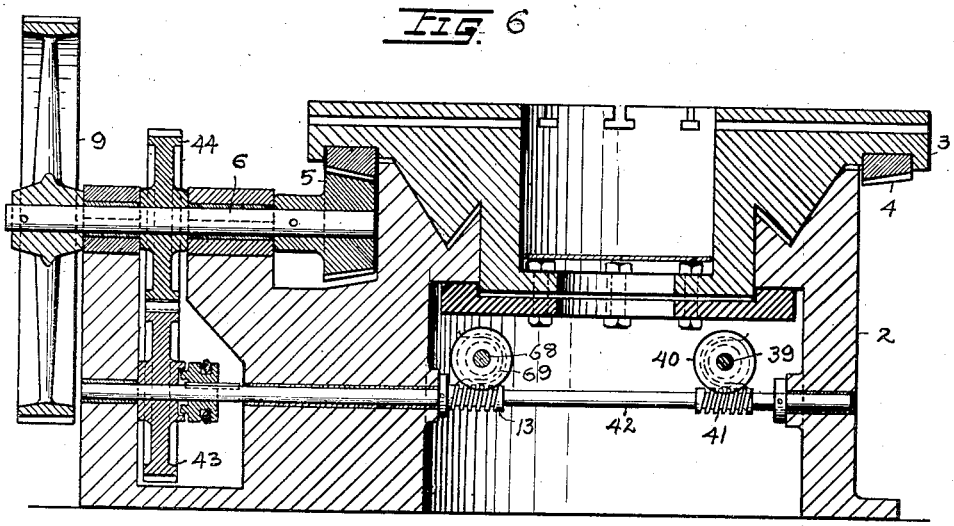

UNITED STATES PATENT OFFICE.

JOHN C. FIDDYMENT, OF AKRON, OHIO.

MACHINE FOR FINISHING TIRE-MOLDS.

1,339,816.          Specification of Letters Patent.      Patented May 11, 1920.

Application filed December 23, 1918. Serial No. 267,914.

*To all whom it may concern:*

Be it known that I, JOHN C. FIDDYMENT, a citizen of the United States, residing at Akron, in the county of Summit and State of Ohio, have invented certain new and useful Improvements in Machines for Finishing Tire-Molds, of which the following is a specification.

This invention relates to a machine for finishing tire molds, the object of the invention being to provide a special machine capable of accurately finishing tire molds of various shapes in a rapid and efficient manner and with uniformity in quantity production.

In the accompanying drawings, Figure 1 is a front view and vertical section centrally through the base of the machine. Fig. 2 is a plan view of the machine, and Fig. 3 is a side elevation looking from the left of Fig. 2. Fig. 4 is an enlarged sectional view on line 4—4, Fig. 1, of the swiveled tool holder and its operating and supporting parts, while Fig. 5 (Sheet 1) is a sectional view of the same parts on the same scale as Fig. 1, but taken on line 5—5, Fig. 1. Fig. 6 is a vertical section of the base, showing the shaft and gear mechanism for rotating the platen or table upon which the tire-mold is placed. Fig. 7 is a front view of the tool-carrying turret, and Fig. 8 is a sectional view thereof on line 8—8, Fig. 7. Figs. 9 and 10 are enlarged detail views of one form of adjustable tool holder adapted to be used in the turret of my improved machine.

The machine comprises a stationary bed or base 2 of any suitable shape and form, upon and within which a flat circular table 3 is seated and adapted to be rotated by a ring gear 4 at its bottom and a bevel gear 5 on power shaft 6, see Fig. 6. A motor 7 is shown to operate shaft 6 through a pinion 8 and a large gear 9, but any other mode of rotating the table may be employed. The table is also shown as provided with rabbeted channels radially thereof to adjustably hold suitable clamping devices 10, for the work. As shown, one section or half of a circular tire-mold 11, is clamped upon the table, the axis of the tire-mold being coincident with the vertical axis of the table, and the center of the table is preferably open or recessed to permit the segmental rack 12 of a swiveled tool-holder 14 to project therein, see Fig. 1.

The tire molds 11 in general use are made in two cast sections or halves having corresponding annular channels of various shapes and patterns according to the form of tire to be molded, and before such molds can be used the surfaces of the channels must be finished smoothly to the right size and shape. Different tools are required to do this work and the present machine is particularly constructed to provide accurate adjustments and settings of the tools at different angles and distances relatively to the vertical axis of the table and to the work so that circular molds of different diameters and shapes may be operated upon.

Thus the first rough cutting of the mold, especially the irregular curved surface of the channel which forms the side and tread portions of the tire, is performed by a cutting tool 15 clamped in a holder 14 which is mounted for longitudinal adjustment on a swiveled arm or bar 17 having a curved rack or toothed segment 12 affixed thereto at its free end, see Fig. 1. A worm gear 19 on a short shaft 20 engages the curved rack or segment 12 and causes it to travel around the curved track or guide-way 21 on a plate 22 which is dove-tailed to slide horizontally over the table on a bracket or head 23 which in turn is dovetailed to slide vertically on an upright standard 24 at one side of base 2. A vertical screw 25 is rotatably supported in an overhanging arm 26 at the top of standard 24, and this screw engages and is adapted to raise and lower bracket 23 and the parts carried thereby so that the cutting tool —15— may be set at any suitable working elevation relatively to the tire-core 11. Furthermore, the horizontally-slidable plate 22 may be actuated by a screw 27 extending through an ear 28 on bracket 23 so as to adjust and set the tool various distances from the vertical axis of the table and the tire mold. In this way the tool may be placed to cut and finish the channeled surfaces in tire-molds of different diameter, and inasmuch as the tool-holder arm is pivoted or swiveled on a stud 28 in plate 22, a different radial setting of the tool relatively to the channel in the tire-mold may be obtained step by step while the table and the tire-mold thereon is being rotated. Briefly stated, the swivel or pivot center for the tool may be adjusted vertically and also horizontally relatively to the tire-mold so as to permit the cutting point of the tool to swing in an arc corresponding to the cross section curvature of the channel to be cut or finished. However, all channels in tire molds are not true circles; in fact the transverse surface outline of the channel is generally very irregular. Thus in many instances the curved surfaces which make the sides of the tire are of irregular curvature or on sloping straight lines merging with curved lines, and in order to correctly cut and finish the tire-mold to produce such shaped tires, the present machine is designed to automatically shift the cutting tool longitudinally so as to produce an irregular curve or a straight line while the tool and its holder is moving on an arc described from the pivot or swivel point represented by stud 28. The arc movement of the tool and its supporting parts is obtained by the segmental rack and worm gear, hereinbefore described, while the longitudinal movement of the tool depends primarily upon a curved cam member 29 replaceably secured to plate 22 within a ribbed and recessed portion thereof so that the inner cam edge of said member may be engaged by a lug 30 on an adjustable piece 31 inset at the rear side of the tool holder 14 which is socketed in arm or bar —17—, see Fig. 4. A swiveled adjusting set screw 16 affords means for regulating the depth of cut of the tool, and a coiled spring 32 interposed between lateral projections on the holder and arm in connection with a bolt and nut 33 provides self-acting means for maintaining constant riding contact of lug 30 against cam member 29. This cam member is interchangeable, that is it may be replaced by another having a different formation made and designed to move the tool in an arc according to the curved or irregular shape of any tire-mold to be cut and finished, and the power for shifting the tool holder and arm in an arc may be by manually-operated means, or by automatic mechanism timed to shift the tool to different radial positions while the table and the tire-mold are being rotated at a given speed. As shown in Fig. 1, the worm shaft 20 is slidably splined within the hub of a bevel gear 34 carried by a bearing bolted to the vertically-movable bracket or head 23, and this power-transmitting connection permits the plate 22 and the parts carried thereby to be shifted horizontally at will. A similar accommodating power-transmitting connection is provided for the bevel gear 35 which drives gear 34, in that a vertical shaft 36 is supported in suitable bearings at the side of standard 24 and splined to slide in the hub of the bevel gear 35 so as to permit the bracket or head 23 to be moved vertically on the standard. The lower end of vertical shaft 36 is equipped with a pair of bevel gears 37 and 37' adapted to be thrown out of and into mesh with a bevel gear 38 on a horizontal shaft 39 having a gear 40 meshing with and driven by a worm pinion 41 on a countershaft 42 within the base 2, and which countershaft is operated by a set of spur gears 43 and 44 deriving their power from the main shaft 6, see Fig. 6.

In view of the many different types of tire-molds in use, and the need of different cutting, finishing and smoothing operations for each job, I have also embodied in this machine a turret 45 mounted to revolve upon a horizontal stud shaft 46 extending over and toward the vertical axis or center of the revoluble table on base 2. The stud shaft 46 forms part of a vertically-slidable head 47 mounted upon a second rigid upright or standard 48 bolted to one side of the base, and a screw 49 driven by suitable gears 50 and 51 serves to raise and lower the said head and turret relatively to the revoluble table and the tire-mold thereon so that anyone of a plural number of different tools held radially in the turret may be used on the work. Moreover, the holders 52 for such tools, are each mounted in rabbeted grooves extending transversely across the circular face of the turret, so that said holders may be moved parallelly with the axis of the turret and each tool set accurately at various distances from the vertical axis of the revoluble table thereby permitting individual adjustments and settings for each tool as well as permitting work to be done on tire-molds of any diameter. Each holder 52 is moved longitudinally in its groove by means of a screw 53 having a swiveled connection with a ring 54 fixed in one side face of the turret, and the opposite ends of the screw are squared to receive a wrench socket or its equivalent, wherewith to rotate the screw manually, although provision may also be made in this machine to rotate said screws by power derived from the main shaft. Thus, in Fig. 8 I show a short shaft 55 with an end socket adapted to engage the squared end 56 of screw 53 where projected within a recess in ring 54, and this shaft may be operated by a gear 57, the shaft being slidably splined thereto. That is the shaft is mounted to slide longitudinally within limits to engage and disengage itself from the square end of the screw, and a suitable lever 58 or other device may be used to shift the shaft for that purpose whenever it is desired to rotate the turret. Locking of the turret against rotation may also be effected by a spring-pressed bolt 59 adapted to enter bushed openings 60 in the side face of the turret, see Fig. 8. A crank member 61 is also shown in this view in screw-engagement with one end of the bolt, but any other suitable means may be provided for withdrawing the bolt.

The power-transmitting mechanism for the turret lift screw 49 comprises gears 50 and 51 and a vertical shaft 62 having a clutch 63 to throw it into and out of action. A lower separate end 64 of said shaft has a bevel gear 65 adapted to mesh with either one of the two bevel gears 66 and 67, respectively, on the cross shaft 68 having a worm gear 69 located within hollow base 2 and driven by a worm pinion 13 on counter shaft 42. A short upright shaft 70, shown in Fig. 3 is driven by a pair of spur gears 71 and 72, and the upper end of this shaft is provided with a worm or screw 73 held between bearings on a bracket 74 bolted to the outer face of the slidable head 47 on standard 48, while the lower end of the shaft is keyed to but free to slide in spur gear 72 and through the bearings 75 which hold said gear in mesh with gear 71 on shaft 64. Worm 73 meshes with gear 57 on shaft 55 which rotates the screw 53 when engaged therewith as shown in Fig. 8.

Cross shaft 68 extends through base 2 and has bevel gear driving connection with a vertical shaft 81 mounted at one side of standard 24, and the upper end of shaft 81 is provided with a pinion 82 to drive an idler pinion 83 and therethrough a gear 84 affixed to the upper end of the feed screw 25, see Fig. 2.

In Figs. 9 and 10, I show a modified form of tool holder 76 for use in turret 45, in which a tool 77 is secured within a slide 78 set at an angle within the rounded extremity of the body of the holder. The slide may be moved outwardly and also retired by a screw 79 having a wrench-engaging end 80 projecting beyond the end face of the holder. A holder of this kind facilitates the cutting of grooves in the curved surfaces of the mold.

The working assembly described herein may be modified in many ways and still embody the essentials of the invention, and while the machine has been referred to and shown as applicable to the planing and finishing of a tire-mold it is obvious that the machine may be used for planing and finishing any other ring or disk-shaped work on circular lines.

What I claim is:

1. In a machine for finishing tire molds, a table adapted to fix the mold thereon, a tool holder pivoted to sweep transversely in an arc over the mold supporting face of said table and a spring adapted to move said holder longitudinally away from the mold, a tool mounted on one end of said holder, and an arcuate member adapted to shift said tool longitudinally in the arc movement of said holder and tool and in the direction of the mold.

2. In a machine for finishing tire molds, a rotatable table, an arm swiveled at its lower end opposite said table, a tool holder adjustable longitudinally on said arm, a tool at the lower end of said arm, means to move said holder in an arc transversely of the tire mold, and automatic means adapted to shift the holder longitudinally in its arc movement.

3. In a machine for finishing tire molds, a table for the tire mold, a tool and a holder therefor movable in an arc across the upper surface of the mold and an interchangeable arcuated member adapted to move the tool in the direction of the tire mold while the tool is describing an arc movement.

4. In a machine for finishing tire molds, a rotatable work-holding table, a tool and holder therefor movable in an arc relatively to the face of said table, co-acting means to automatically rotate said table and move said tool and holder concurrently and an arcuated member adapted to shift said holder and tool longitudinally while turning in an arc.

5. In a machine for finishing tire molds, a rotatable support for the tire mold, a tool holder pivoted over said table and adapted to describe an arc movement radially of the table, and an arcuated member and a spring to automatically move said tool holder in reverse directions relatively to the mold.

6. In a machine for finishing tire molds, a rotatable support for the tire mold, a tool and a holder therefor having an automatic arc movement radially across the face of said support, and means to automatically shift the tool longitudinally during cutting operations.

7. In a machine for finishing tire molds, a rotatable table, a pivoted member having a tool and a holder therefor movably mounted thereon opposite the face of said table, an adjustable device and an arcuated cam adapted to shift said holder longitudinally, and means to turn said member automatically on its pivot.

8. In a machine for finishing tire molds, a rotatable table, a tool and a holder therefor, a supporting member for said holder and tool having a pivot adapting said member to turn around a given center point rearwardly of the cutting end of the tool, and a cam adapted to shift said holder during the turning movements of said member.

9. In a machine for finishing tire molds, a support for the tire mold, a tool and a holder therefor, a support for said tool holder having a pivot stud opposite the tool thereon, a thrust member adjustably fixed to said holder, an arcuated cam engaged with said thrust member, and gear mechanism adapted to automatically turn said support on its pivot.

10. In a machine for finishing tire molds, a rotatable table, a horizontally slidable support over said table, a vertically adjustable head for said support, an arm pivoted at one end on said support, means to give said arm a turning movement upon said slidable support, a tool holder longitudinally movable on said arm, and means adapted to move said holder in opposite directions automatically upon a turning movement of said arm.

11. In a machine for finishing tire molds, a rotatable table for the tire mold, a tool and a holder and a pivoted arm therefor over said table, and an adjustable support for said tool and holder and arm adapted to shift the pivot point radially toward and away from the axis of said rotatable table.

12. In a machine for finishing tire molds, a rotatable table, a slidable member movable transversely over the face of said table, a slidable support for said member movable toward and away from the face of said table, a tool holder movable in an arc upon said member, and a cam adapted to shift said holder in its arm movement.

13. In a machine for finishing tire molds, a rotatable table for the tire mold, a tool holder and a mounting therefor having a pivot over said table, means to adjustably set said pivot for the tool holder various distances from the axis of said table for finishing tire-molds of different diameters, and means to give said mounting and holder a turning movement transversely of the tire mold, and a tool extending from said holder below said pivot.

14. In a machine for finishing tire molds, a rotatable table for the tire mold, and a tool holder movable in an arc across the face of said table transversely of the tire mold and adjustable vertically and also horizontally relatively to the face of the tire mold, said holder having a supporting pivot opposite the face of the table and provided with a tool extending below the pivot toward the face of the table.

15. In a machine for finishing tire molds, a rotatable table, a member having a supporting pivot and adjustable transversely of the table, a tool holder carried by said member and slidable thereon relatively toward said pivot, a tool on said holder extending below said pivot and rack and gear mechanism to turn said member on its pivot.

16. In a machine for finishing tire molds, a rotatable table, a supporting member pivoted above said table and slidable in respect thereto, a tool holder slidably mounted upon said member, and a cam adapted to shift said tool holder during turning movements of said pivoted member.

17. In a machine for finishing tire molds, a rotatable table, a pivoted member horizontally adjustable over said table and a tool holder movably mounted thereon, and an interchangeable cam adapted to shift said tool holder upon said device during turning movements on its pivot.

18. In a machine for finishing tire molds, a rotatable table and means to secure a channeled tire mold thereon having an annular channel in its top, means to rotate said table, and automatic means to feed a cutting tool simultaneously toward and in an arc across the channeled surface of the tire mold while the table and tire mold are under rotation.

19. In a machine for finishing tire molds, a rotatable table. a turret rotatably mounted on an axis extending radially across the face of said table, and tool holders adjustable transversely of said turret and parallel with its axis.

20. In a machine for finishing tire molds, a rotatable table, a turret extending over said table, tool holders and tools adjustably mounted in said turret, and means to raise and lower said turret relatively to said table.

21. In a machine for finishing tire molds, a rotatable table, a turret above said table, tool holders carried by said turret, and means to adjust said tool holders back and forth relatively to the axis of said rotatable table.

22. In a machine for finishing tire molds, a rotatable table, a turret having tool holders adjustably mounted for movement thereon relatively to the axis of said table, and a vertically-movable slide to support said turret.

23. In a machine for finishing tire molds, a turret having a tool holder movable transversely thereof, a slidable support for said turret, and means carried by said support and turret to move said holder and provided with a separable union to permit rotation of the turret.

24. In a machine for finishing tire molds, a turret, a tool holder movably mounted upon said turret, a screw to move said holder, a slidable support for said turret, and a power device on said support to engage and rotate said screw.

Signed at Akron, in the county of Summit, and State of Ohio, this 9th day of December, 1918.

JOHN C. FIDDYMENT.